US009049445B2

(12) United States Patent
Chen et al.

(10) Patent No.: US 9,049,445 B2
(45) Date of Patent: Jun. 2, 2015

(54) DUAL-LAYER BACKWARDS-COMPATIBLE PROGRESSIVE VIDEO DELIVERY

(71) Applicant: DOLBY LABORATORIES LICENSING CORPORATION, San Francisco, CA (US)

(72) Inventors: Tao Chen, Palo Alto, CA (US); Hariharan Ganapathy-Kathirvelu, Santa Clara, CA (US); Samir N. Hulyalkar, Los Gatos, CA (US); Gopi Lakshminarayanan, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/368,640

(22) PCT Filed: Dec. 13, 2012

(86) PCT No.: PCT/US2012/069426
§ 371 (c)(1),
(2) Date: Jun. 25, 2014

(87) PCT Pub. No.: WO2013/103490
PCT Pub. Date: Jul. 11, 2013

(65) Prior Publication Data
US 2014/0376612 A1    Dec. 25, 2014

Related U.S. Application Data

(60) Provisional application No. 61/583,075, filed on Jan. 4, 2012.

(51) Int. Cl.
*H04N 7/12* (2006.01)
*H04N 11/02* (2006.01)
(Continued)

(52) U.S. Cl.
CPC ............. *H04N 19/172* (2014.11); *H04N 7/012* (2013.01); *H04N 13/0029* (2013.01);
(Continued)

(58) Field of Classification Search
None
See application file for complete search history.

(56) References Cited

U.S. PATENT DOCUMENTS

| 4,661,850 A | 4/1987 | Strolle |
| 5,128,791 A | 7/1992 | LeGall |

(Continued)

FOREIGN PATENT DOCUMENTS

| EP | 0598786 | 6/1994 |
| GB | 2273620 | 6/1994 |

(Continued)

OTHER PUBLICATIONS

Dolby's Frame Compatible Full Resolution (FCFR) 3D System Specifications. Dolby Laboratories Inc. Dec. 2010.

(Continued)

*Primary Examiner* — Joseph Ustaris
*Assistant Examiner* — Maryam Nasri

(57) ABSTRACT

Given an input progressive sequence, a video encoder creates a dual-layer stream that combines a backwards-compatible interlaced video stream layer with an enhancement layer to reconstruct full-resolution progressive video. Given two consecutive frames in the input progressive sequence, vertical processing generates a top field-bottom field (TFBF) frame in a base layer (BL) TFBF sequence, and horizontal processing generates a side-by-side (SBS) frame in an enhancement layer (EL) SBS video sequence. The BL TFBF and the EL SBS sequences are compressed together to create a coded, backwards compatible output stream.

20 Claims, 7 Drawing Sheets

(51) Int. Cl.
*H04N 11/04* (2006.01)
*H04N 19/172* (2014.01)
*H04N 7/01* (2006.01)
*H04N 13/00* (2006.01)
*H04N 19/30* (2014.01)
*H04N 19/112* (2014.01)
*H04N 19/187* (2014.01)
*H04N 19/85* (2014.01)
*H04N 19/59* (2014.01)
*H04N 19/34* (2014.01)
*H04N 19/597* (2014.01)

(52) U.S. Cl.
CPC ......... *H04N 13/0048* (2013.01); *H04N 19/597* (2014.11); *H04N 19/30* (2014.11); *H04N 19/112* (2014.11); *H04N 19/187* (2014.11); *H04N 19/85* (2014.11); *H04N 19/59* (2014.11); *H04N 19/34* (2014.11)

(56) References Cited

U.S. PATENT DOCUMENTS

| | | |
|---|---|---|
| 5,216,505 A | 6/1993 | Kageyama |
| 5,270,813 A | 12/1993 | Puri |
| 5,305,104 A | 4/1994 | Jensen |
| 5,329,365 A | 7/1994 | Uz |
| 5,387,940 A | 2/1995 | Kwok |
| 5,408,270 A | 4/1995 | Lim |
| 5,410,354 A | 4/1995 | Uz |
| 5,457,498 A | 10/1995 | Hori |
| 5,475,435 A | 12/1995 | Yonemitsu |
| 5,497,199 A | 3/1996 | Asada |
| 5,508,746 A | 4/1996 | Lim |
| 5,703,654 A | 12/1997 | Iizuka |
| 5,742,343 A | 4/1998 | Haskell |
| 6,069,664 A | 5/2000 | Zhu |
| 6,366,324 B1 | 4/2002 | Van Rooy |
| 6,490,321 B1 | 12/2002 | Sugiyama |
| 6,700,933 B1 | 3/2004 | Wu |
| 7,447,264 B2 | 11/2008 | Sugiyama |
| 2004/0101049 A1* | 5/2004 | Sugiyama ............... 375/240.12 |
| 2007/0009039 A1 | 1/2007 | Ryu |
| 2007/0086666 A1 | 4/2007 | Bruls |
| 2007/0140350 A1* | 6/2007 | Sakazume et al. ....... 375/240.21 |
| 2009/0154562 A1 | 6/2009 | Syed |
| 2009/0225869 A1 | 9/2009 | Cho |
| 2009/0262803 A1 | 10/2009 | Wang |
| 2009/0304081 A1 | 12/2009 | Bourge |
| 2010/0033622 A1 | 2/2010 | Bellers |
| 2011/0050851 A1 | 3/2011 | Chen |
| 2011/0074922 A1* | 3/2011 | Chen et al. ..................... 348/43 |
| 2011/0134214 A1 | 6/2011 | Chen |
| 2012/0027079 A1* | 2/2012 | Ye et al. .................. 375/240.02 |
| 2012/0092452 A1 | 4/2012 | Tourapis |

FOREIGN PATENT DOCUMENTS

| | | |
|---|---|---|
| WO | 2013/040170 | 3/2013 |
| WO | 2013/049179 | 4/2013 |
| WO | 2013/049383 | 4/2013 |

OTHER PUBLICATIONS

ITU-T and ISO/IEC JTC 1, "Advanced Video Coding for Generic Audiovisual Services" ITU-T Recommendation H.264 and ISO/IEC 14496-10, 2009.
Tourapis, A.M. et al "A Frame Compatible System for 3D Delivery" MPEG Meeting, Jul. 26-30, 2010, ISO/IEC JTC1/SC29/WG11.

* cited by examiner

US 9,049,445 B2

DUAL-LAYER BACKWARDS-COMPATIBLE PROGRESSIVE VIDEO DELIVERY

CROSS-REFERENCE TO RELATED APPLICATIONS

This application claims the benefit of priority to U.S. Provisional Patent Application Ser. No. 61/583,075, filed on Jan. 4, 2012, which is hereby incorporated by reference in its entirety.

TECHNOLOGY

The present invention relates generally to images. More particularly, an embodiment of the present invention relates to the delivery of a dual-layer stream that combines a backwards-compatible interlaced video stream layer with an enhancement layer to reconstruct full-resolution progressive video.

BACKGROUND

Video broadcasting standards for digital television, such as the ATSC (Advanced Television Systems Committee) specification in the United States and the family of DVB (Digital Video Broadcasting) international standards, allow broadcasters to transmit digital content in a variety of resolutions and formats, such as 480p (e.g., 720×480 at 60 frames per second), 1080i (e.g., 1920×1080 at 60 fields per second), or 720p (1280×720 at 60 frames per second). Typically, a broadcasting station will allocate one or more channels for a particular broadcast, where each channel utilizes a single transmission format. For example, a sports station may broadcast a football game in 720p in one channel and in 480p in another channel. Broadcasting stations may prefer to use progressive transmission mode (e.g., 720p) for sports or movies, and interlaced transmission (e.g., 1080i) for regular programming (e.g., news and daytime TV series).

As more and more consumers invest into 1080p HDTVs, there is an increased interest from broadcasters to offer premium programming, such as movies and special sports broadcasts, using 1080p (e.g., 1920×1080 at 60 or 50 frames per second) transmission formats. Since many older receivers and TV sets may not be able to decode 1080p broadcasts, to accommodate backwards compatibility with those sets, broadcasters could transmit both a 720p or 1080i stream and a 1080p stream on two separate channels; however, such solutions require at least twice the bandwidth of a traditional 720p or 1080i high definition (HD) broadcast.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
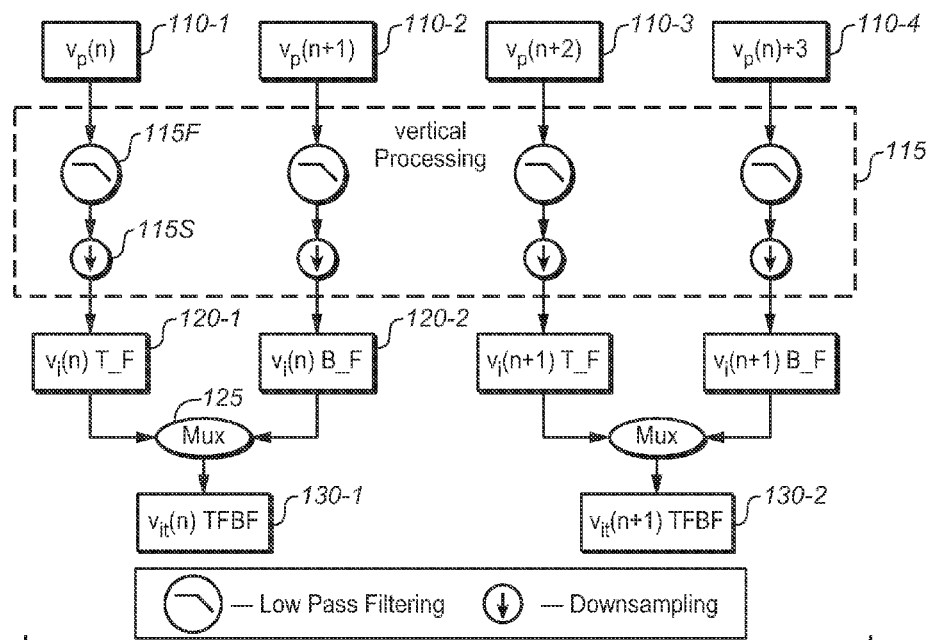
FIG. 1A and FIG. 1B depict example data flows for generating base layer and enhancement layer streams according to an embodiment of the present invention.

Dual-layer, backwards compatible delivery of progressive video is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to dual-layer, backwards compatible, delivery of high frame rate progressive video. In an embodiment, given an input progressive sequence, a video encoder creates a coded dual-layer stream that combines a backwards-compatible interlaced video stream layer with a full-resolution progressive video stream layer. Given two consecutive frames in the input progressive sequence, vertical processing generates a top field-bottom field (TFBF) frame in a base layer (BL) TFBF sequence, and horizontal processing generates a side-by-side (SBS) frame in an enhancement layer (EL) SBS video sequence. The BL TFBF and the EL SBS sequences are compressed together to create a coded, backwards compatible output stream.

In an another embodiment, a decoder accesses a coded base layer (BL) top field-bottom field (TFBF) stream and a coded enhancement layer (EL) side-by-side (SBS) stream, where the coded BL TFBF stream was generated by an encoder based on vertical processing of at least two consecutive frames of a progressive video sequence, and the coded EL SBS stream was generated by an encoder based on horizontal processing of the at least two consecutive frames of the progressive video sequence. The coded BL TFBF stream may be decoded to generate an interlaced output sequence. The coded EL SBS stream may be decoded to generate a decoded SBS sequence. The decoded BL TFBF and EL SBS sequences may be demultiplexed to generate a progressive output sequence.

In an embodiment, given an input progressive sequence, a video encoder creates a dual-layer stream that combines a backwards-compatible interlaced video stream layer with a residual video stream layer. Given two consecutive frames in the input progressive sequence, vertical processing generates a top field-bottom field (TFBF) frame in a base layer (BL) TFBF sequence. Horizontal processing is applied to residuals between the input progressive sequence and up-sampled frames based on the BL TFBF sequence to generate an enhancement layer (EL) SBS residual sequence. The BL TFBF video sequence and the EL SBS residual sequence are compressed together to create a coded, backwards compatible output stream.

Example Residual-Free Dual-Layer Video Delivery System

In digital HDTV (High Definition Television) broadcasting, 720p and 1080i are two of the most popular transmission formats. Progressive transmission (e.g., 720p) is typically preferred for fast-action sequences, such as sports, since it offers higher vertical resolution than equivalent interlaced content (e.g., 1080i). On the other hand, interlaced transmission (e.g., 1080i) offers higher horizontal resolution and may require less transmission bandwidth than progressive video content transmitted at the same video quality.

In recent years, due to dramatic price decreases, more and more consumers have adopted 1080p HDTV sets. As 1080p HDTVs proliferate, there is an increased interest from broadcasters to offer premium programming, such as movies and sports broadcasts, using 1080p transmission formats. Since older TV sets and set-top boxes may not support 1080p decoding, one way to accommodate backwards compatibility is to transmit simultaneously, on separate channels, both a 1080p stream and a legacy stream; however, such a solution requires at least twice the bandwidth of a traditional high definition (HD) broadcast.

In an alternative implementation, one could apply hierarchical or layered coding methods. In such methods, a base layer (BL) carries a first stream in a first format (e.g., 720p or 1080i) and an enhancement layer (EL) carries a residual signal representing the difference between a second stream in a second format (e.g., 1080p) and a predicted version of the second stream using the base layer. Legacy decoders can decode only the base layer and ignore the enhancement layer; however, newer decoders can use both the base layer and the enhancement layer to reconstruct the second (e.g., 1080p) stream.

The conversion of a high-resolution, high-frame rate, video (e.g., 1920×1080 at 60 frames per second), to a corresponding interlaced video (e.g., 1920×1080 at 60 fields per second) comprises applying to the progressive input video a single, low-pass, vertical filtering process to reduce anti-aliasing artifacts due to the down-sampling process. Because such filtering is applied only to the base layer, the decoder can never fully restore the lost high frequencies from the original progressive signal, and the reconstructed progressive output may lose sharpness and fine detail. Embodiments of the present invention overcome these limitations by utilizing a combination of vertical and horizontal pre-processing in the base and the enhancement layers, respectively. By preserving high-frequency content in both the horizontal and vertical directions, compared to the prior art, embodiments provide better picture quality in the reconstructed progressive picture.

Figure 2:
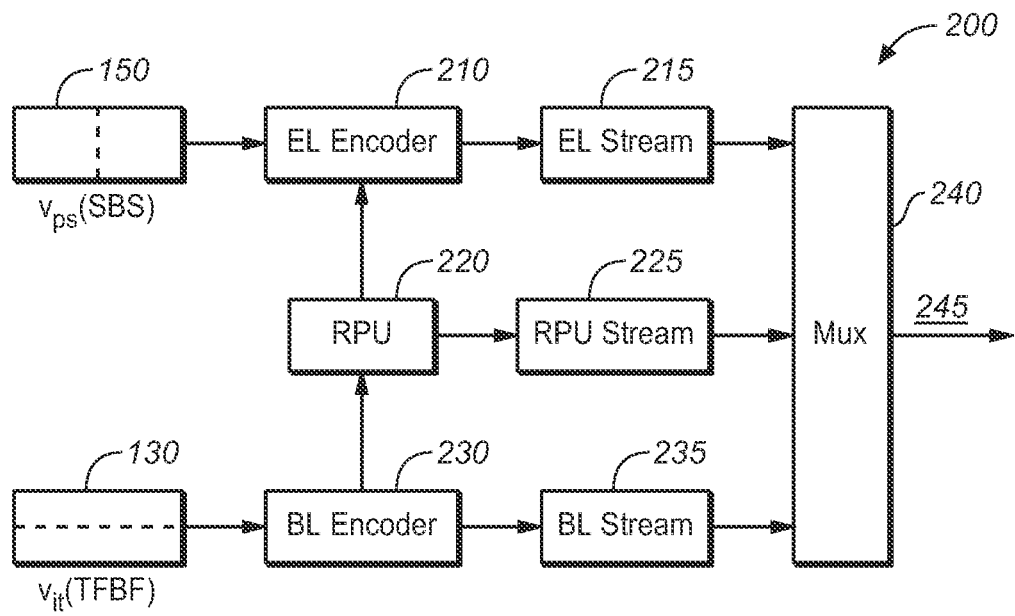
FIG. 2 depicts an example dual-layer, backwards-compatible encoder system for delivering progressive video according to an embodiment of the present invention.

FIG. 2 depicts an example embodiment of a dual-layer encoding system for delivering high frame-rate progressive and interlaced video using multiview coding (MVC). As used herein, the term "multiview coding" denotes a video compression method that enables efficient encoding (compression) of two or more video sequences representing multiple, but similar, views of the same scene. An example of MVC coding is defined in Annex H of the ITU-T H.264 specification for coding of moving video. In MVC, the encoder creates a base-view, which can be decoded independently of all other views, and one or more non-base views that are based on both inter-frame and inter-view dependencies. A typical application of MVC coding can be found in coding 3-D pictures where one view (e.g., the left camera view) is coded independently and the second view (e.g., the right camera) is coded based on information on both views.

As depicted in FIG. 2, the interlaced top field-bottom field (TFBF) input sequence (130) may comprise the base view and the side-by-side (SBS) sequence (150) may comprise a second, non-base view. The two views may be compressed into a single backwards compatible coded stream 245 that comprises a coded base layer interlaced stream 235, a coded enhancement layer progressive stream 215, and metadata, denoted as an RPU (reference processing unit) stream 225.

As used herein, the term "metadata" denotes any ancillary information that is embedded or transmitted in parallel with a coded bitstream and assists a decoder to render a decoded image. Such metadata may include, but are not limited to, such data as: color space or gamut information, dynamic range information, tone mapping information, or information related to processing reference frames.

FIG. 1 depicts in more detail an embodiment for constructing the BL TFBF 130 and EL SBS 150 input sequences (or views) to be used by encoder 200. Given a sequence of progressive (e.g. 1080p) input frames $v_p$ 110, FIG. 1A depicts an example processing flow for creating a sequence of corresponding top field-bottom field (TFBF) interlaced frames $v_{it}$ 130. As depicted in FIG. 1A, each frame of the input sequence $v_p$ may first be processed by a vertical processing unit 115 that comprises a low pass filter 115F and a down-sampler 115S.

As used herein, the term "vertical processing" denotes image processing operations, such as filtering and down-sampling, that is applied vertically (e.g., from top to bottom or bottom to top) to the pixels of an input frame. Similarly, as used herein, the term "horizontal processing" denotes image processing operations, such as filtering and down-sampling, that is applied horizontally (e.g., from left to right or right to left) to the pixels of an input image. As it is well known in the art of image processing, such horizontal or vertical processing may be performed by a variety of means, including 1-D or 2-D filtering kernels and sub-sampling processing.

Following low pass filtering 115F, each frame is sub-sampled vertically to create one of the fields in the interlaced output sequence $v_{it}$ 130. For example, as shown in FIG. 1A, given two consecutive 1080p frames $v_p(n)$ 110-1 and $v_p(n+1)$ 110-2 (e.g., 1920×1080 each), $v_p(n)$ 110-1 may be used to construct the top field (T_F) 120-1 of $v_{it}(n)$ 130-1 and $v_p(n+1)$ 110-2 may be used to create the bottom field (B_F) 120-2 of $v_{it}(n)$ 130-1. For example, for baseline 1080i transmission, each of these fields (120) has half the vertical resolution of the input frames (e.g., 1920×540).

Figure 1B:
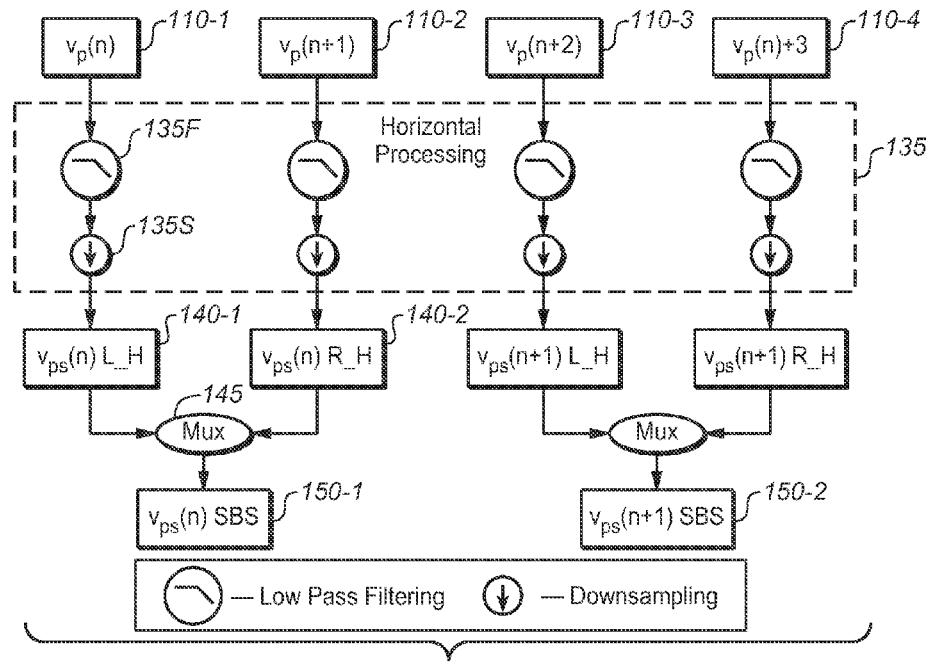

Given an input sequence of progressive video frames $v_p$ 110, FIG. 1B depicts an embodiment for creating a sequence of corresponding side-by-side (SBS) frames $v_{ps}$ 150. As depicted in FIG. 1B, each frame of input $v_p$ may be processed by a horizontal processing unit 135 that comprises a low pass filter 135F followed by a horizontal sub-sampling unit 135S to yield left-half (L_H) or right-half (R_H) frames, each at lower (e.g., half) the horizontal resolution of the input frames. For example, as shown in FIG. 1B, given two consecutive frames $v_p(n)$ 110-1 and $v_p(n+1)$ 110-2 (e.g., 1920×1080 each), $v_p(n)$ 110-1 may be used to construct the left half (140-1) of $v_{ps}(n)$ 150-1, and $v_p(n+1)$ 110-2 may be used to construct the right half (140-2) of $v_{ps}(n)$ 150-1. For example, for a 1080i baseline format, each of these sub-frames (140) may have half the horizontal resolution of the input frames (e.g., 960×1080), but when combined together by a multiplexer 145, they form a sequence of full-resolution SBS progressive (e.g., 1920×1080) frames (150).

Figure 7:
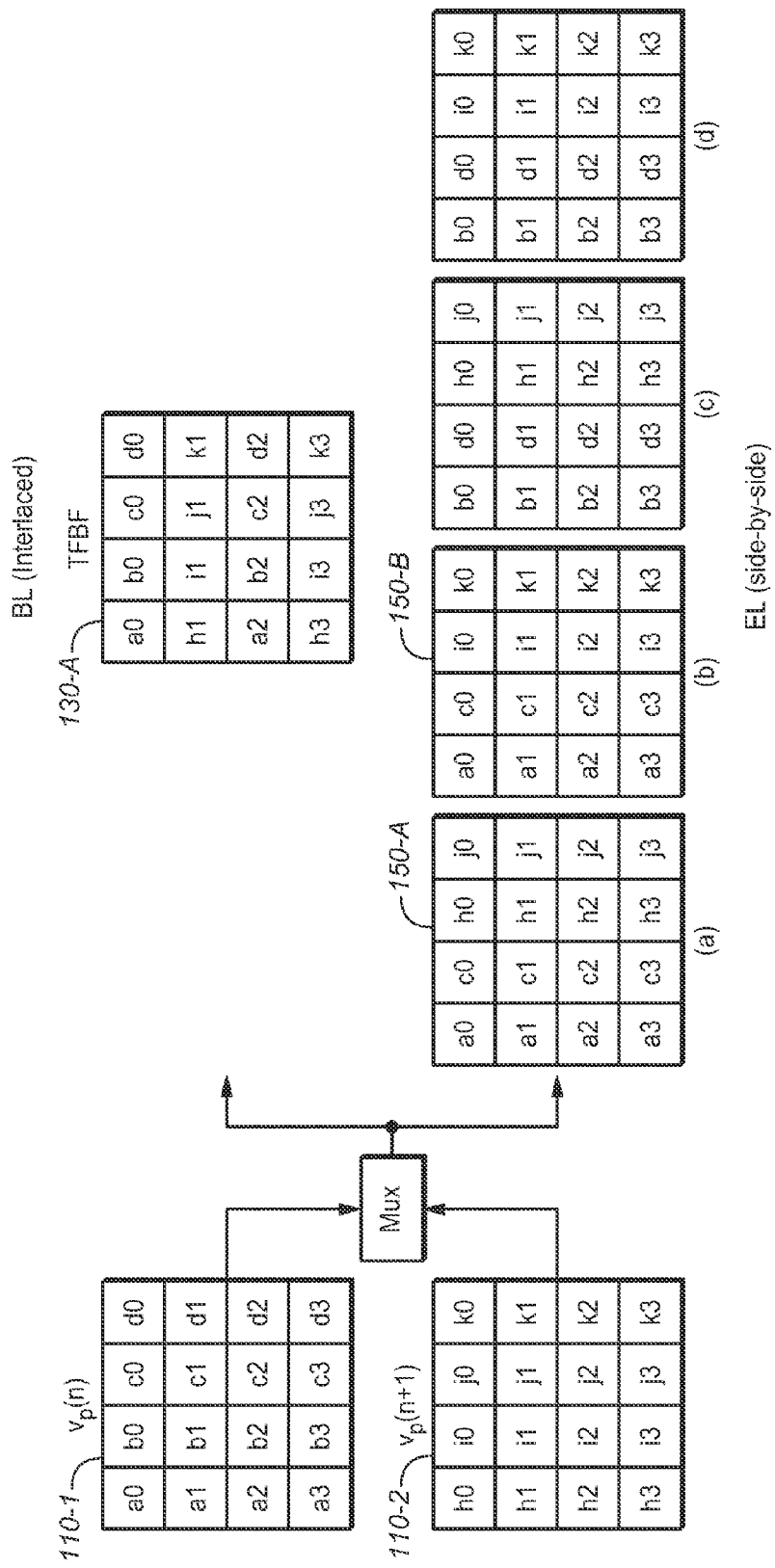
FIG. 7 depicts example vertical and horizontal multiplexing formats for base and enhancement layers according to an embodiment of the present invention.

FIG. 7 depicts a variety of alternative embodiments on how input progressive frames (e.g. 110) may be down-sampled and multiplexed to create either a TFBF frame (720 or 130) or an SBS frame (710 or 150). The chosen multiplexing format depends on a variety of factors and may be signaled to a decoder as metadata using the RPU stream 225.

Returning to FIG. 2, given two input video sequences: a base layer (BL) top field-bottom field (TFBF) interlaced sequence $v_{it}$ 130 and an enhancement layer (EL) side-by-side (SBS) progressive sequence $v_{ps}$, an encoder system comprising a BL encoder, an EL encoder, and a reference processing unit (RPU) may generate a backwards-compatible bit stream 245 by multiplexing two compressed (or encoded) bit streams (the BL stream 235 and the EL stream 215) and the RPU stream 225.

The BL encoder may comprise any video compression encoder, such as those based on the MPEG (Motion Pictures Experts Group) (e.g., MPEG-2, MPEG-4, or H.264) or JPEG2000 specifications, or any other video encoders known in the art. Such an encoder may encode (compress) the $v_{it}$ sequence 130 on its own, without any reference to the $v_{ps}$ sequence. The EL encoder may also comprise any video compression encoder, such as those based on the MPEG (e.g., MPEG-2, MPEG-4, or H.264) or JPEG2000 specifications, or any other video encoders known in the art. In some embodiments, the EL encoder may be the same type as the BL encoder (e.g., both may be based on the H.264 specification). In other embodiments, the EL and BL encoders may be based on different specifications. For example, the BL encoder may be based on MPEG-2 specification, but the EL encoder may be based on the H.264 specification or a proprietary video encoder. The EL encoder could encode (compress) the $v_{ps}$ sequence 150 on its own, without any reference to the $v_{it}$ sequence 130; however, in a more efficient embodiment, each frame in the $v_{ps}$ sequence 150 may be encoded by taking into consideration reference frames from both the $v_{ps}$ 150 and the $v_{it}$ 130 sequences.

Reference processing unit (RPU) 220 interfaces with both the BL encoder 230 and EL encoder 210. As described in PCT application 13/376,707 "Encoding and decoding architecture for format compatible 3D video delivery," by A. Tourapis et al., incorporated herein by reference, the RPU 220 may serve as a pre-processing stage that processes information from BL encoder 230, before utilizing this information as a potential predictor for the enhancement layer in EL encoder 210. Information related to the RPU processing may be communicated (e.g., as metadata) to a decoder (e.g., 300) using the RPU stream 225. Some embodiments may not use an RPU unit. Some embodiments may encode the $v_{ps}$ 150 and the $v_{it}$ 130 sequences using a multi-view encoder (MVC) as specified by the H.264 coding specification.

Figure 3:
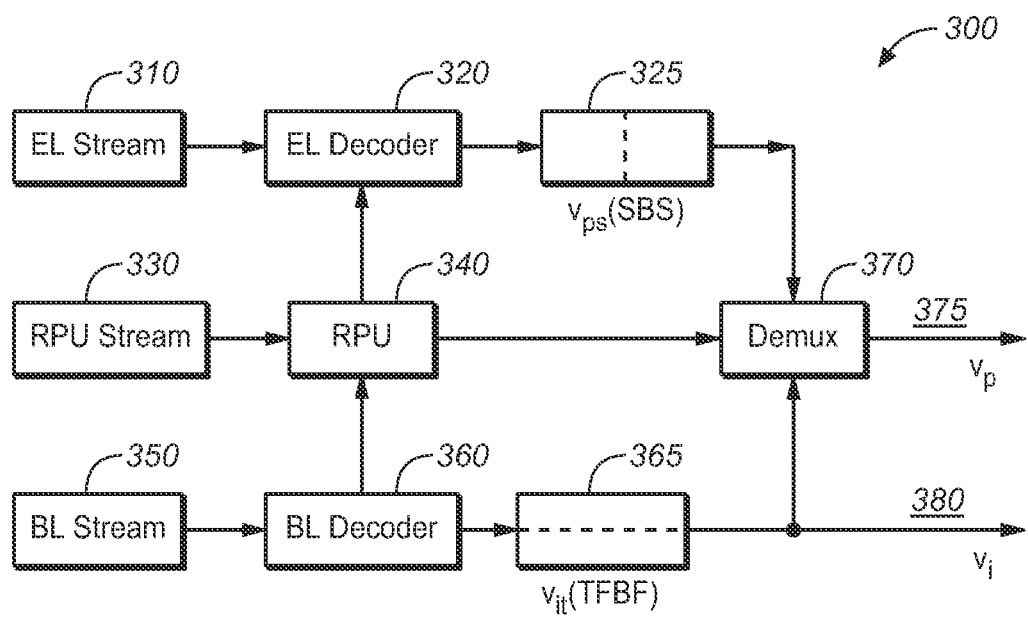
FIG. 3 depicts an example dual-layer, backwards-compatible system for decoding progressive and interlaced video according to an embodiment of the present invention.

FIG. 3 depicts an embodiment for a dual-layer, backwards-compatible decoder according to an example implementation. After demultiplexing the transmitted dual-layer bit stream (e.g., 245) (not shown), a decoder may extract three bit streams: compressed BL and EL streams (350 and 310) and an RPU stream 330. The RPU stream 330 comprises auxiliary information that may assist RPU processor 340 to preprocess decompressed BL data (365) before the EL decoder 320 utilizes such information as reference data in decoding the EL stream 310.

Using the coded BL stream 350, BL decoder 320 may decompress (decode) and generate a backwards compatible interlaced $v_i$ sequence 380. Using the coded EL stream 310 and information from the RPU unit 340 (e.g., reference frames from the BL stream 350), EL decoder 320 may also generate progressive SBS sequence $v_{ps}$ 325. Demultiplexer 370 may combine the TFBF sequence 365 and the SBS sequence 325 to generate progressive sequence $v_p$ 375. Legacy decoders may only be able to decode the backwards-compatible $v_i$ sequence 380. Advanced decoders may be able to decode either one or both of these sequences.

Figure 4:
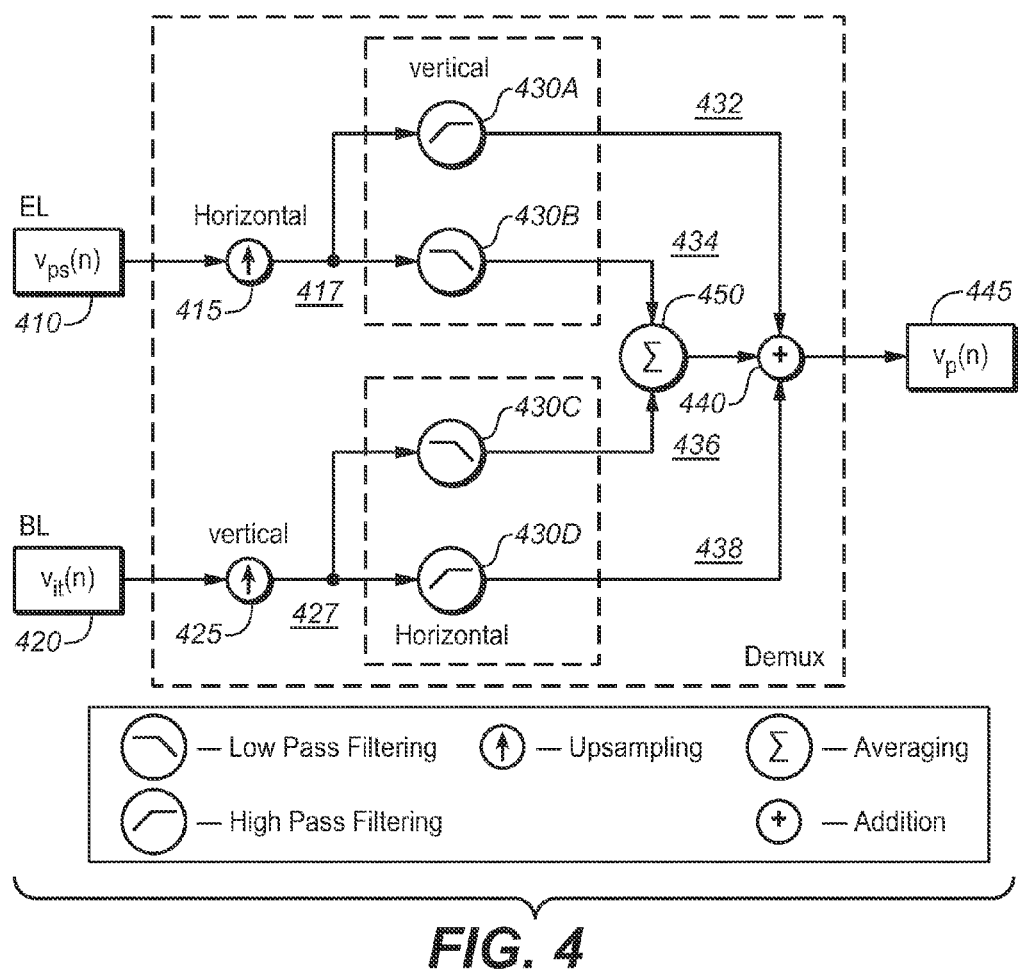
FIG. 4, FIG. 5A, FIG. 5B, and FIG. 6 depict examples of the demultiplexing function depicted in FIG. 3 according to embodiments of the present invention.
Figure 5A:
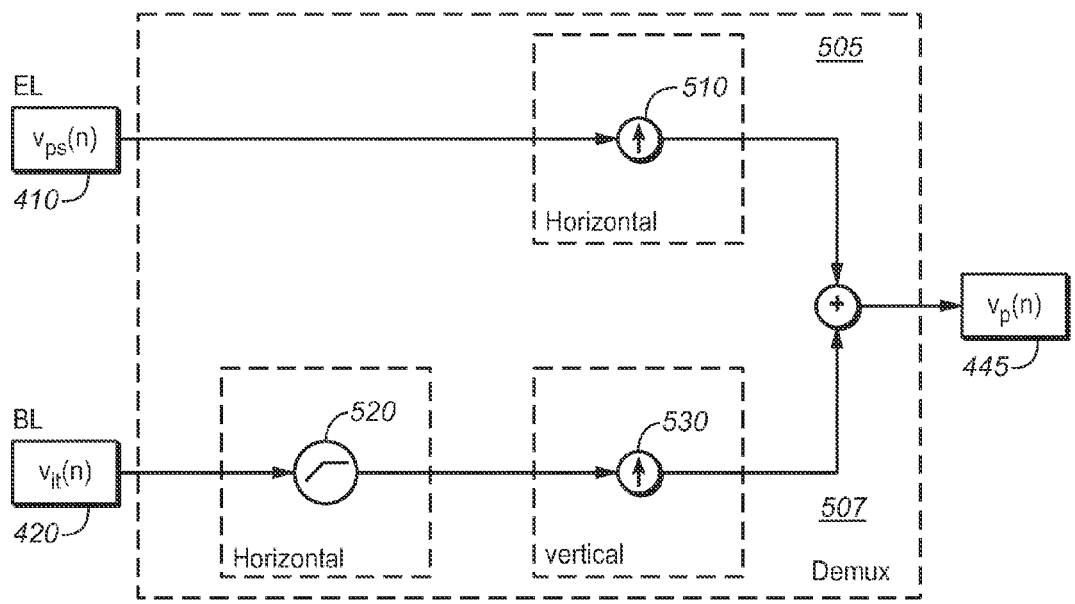
Figure 5B:
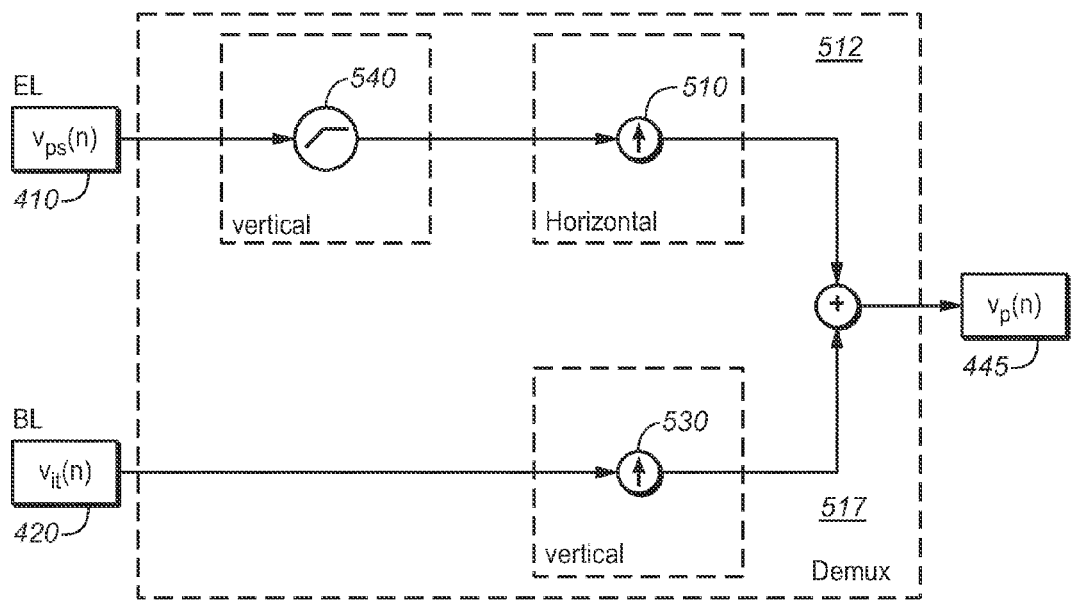
Figure 6:
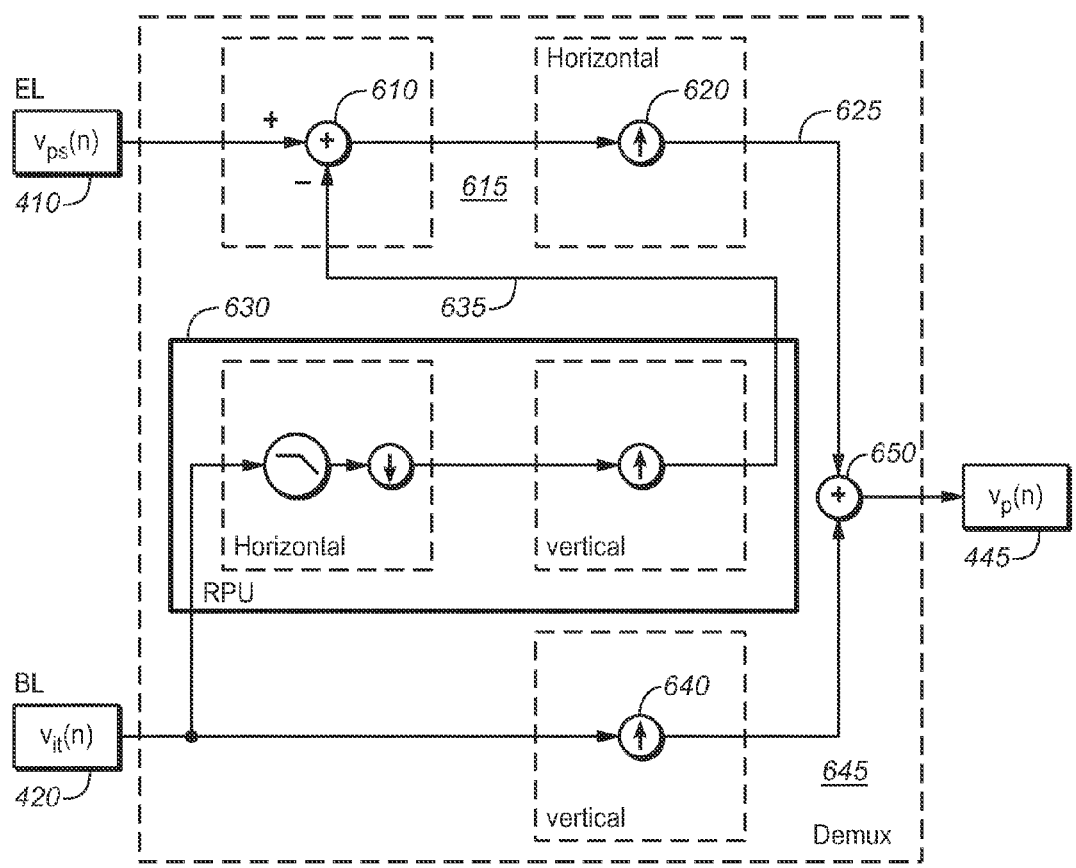

FIG. 4, FIG. 5, and FIG. 6 depict embodiments of decoding demultiplexer 370 according to example implementations. In each of these embodiments, the demultiplexor may access two input images: an input BL field 420, the top field or the bottom field of decoded frame $v_{it}(n)$ (e.g., 365), and an input half-resolution frame 410, the left half-resolution frame or the right half-resolution frame of an EL SBS input frame $v_{ps}(n)$ (e.g., 325). These two inputs (410 and 420) are processed and combined to generate one full-resolution progressive frame $v_p(n)$ 445. These operations may be repeated for the other field of $v_{it}(n)$ and the remaining half-resolution frame of $v_{ps}(n)$ to generate the next consecutive full-resolution progressive frame $v_p(n+1)$.

As depicted in FIG. 4, BL field 420 is first up-sampled in the vertical direction by up-sampler 425 to create a full frame 427. Horizontal low pass filter 430C and high-pass filter 430D may be applied to frame 427 to yield corresponding filtered frames 436 and 438.

Similarly, EL half-resolution frame 410 is up-sampled horizontally by up-sampler 415 to create full-resolution frame 417. Vertical low pass filter 430B and high-pass filter 430A may be applied to frame 417 to yield corresponding filtered frames 434 and 432. All the filtered frames are combined together by averaging unit 450 and adder 440 to yield a full-resolution progressive frame 445.

Due to the low-pass filtering (e.g., 115F and 135F) being applied to the $v_p$ input 110 in the encoder, the demultiplexing process may be simplified according to the embodiments depicted in FIG. 5A and FIG. 5B. These embodiments reduce decoding complexity by eliminating the low-pass filtering (e.g., 430B and 430C) and averaging operations 450 depicted in FIG. 4.

In an alternative embodiment, the high-pass filtering operation (540) depicted in FIG. 5B may also be replaced by a subtraction operation 610, which typically requires less computations. In FIG. 6, a reference frame 635, computed and buffered by RPU 630 (e.g., 340) during the inter-layer prediction process, may be re-used by the demultiplexer 370 to generate the high-pass filtered frame 615.

Example Residual-Based Dual-Layer Video Delivery System

At the expense of some additional processing in the encoder, the operation of decoding demultiplexer 370 may be further simplified in an alternative embodiment that combines methods of vertical and horizontal processing described earlier with inter-layer coding and residual coding.

Figure 8A:
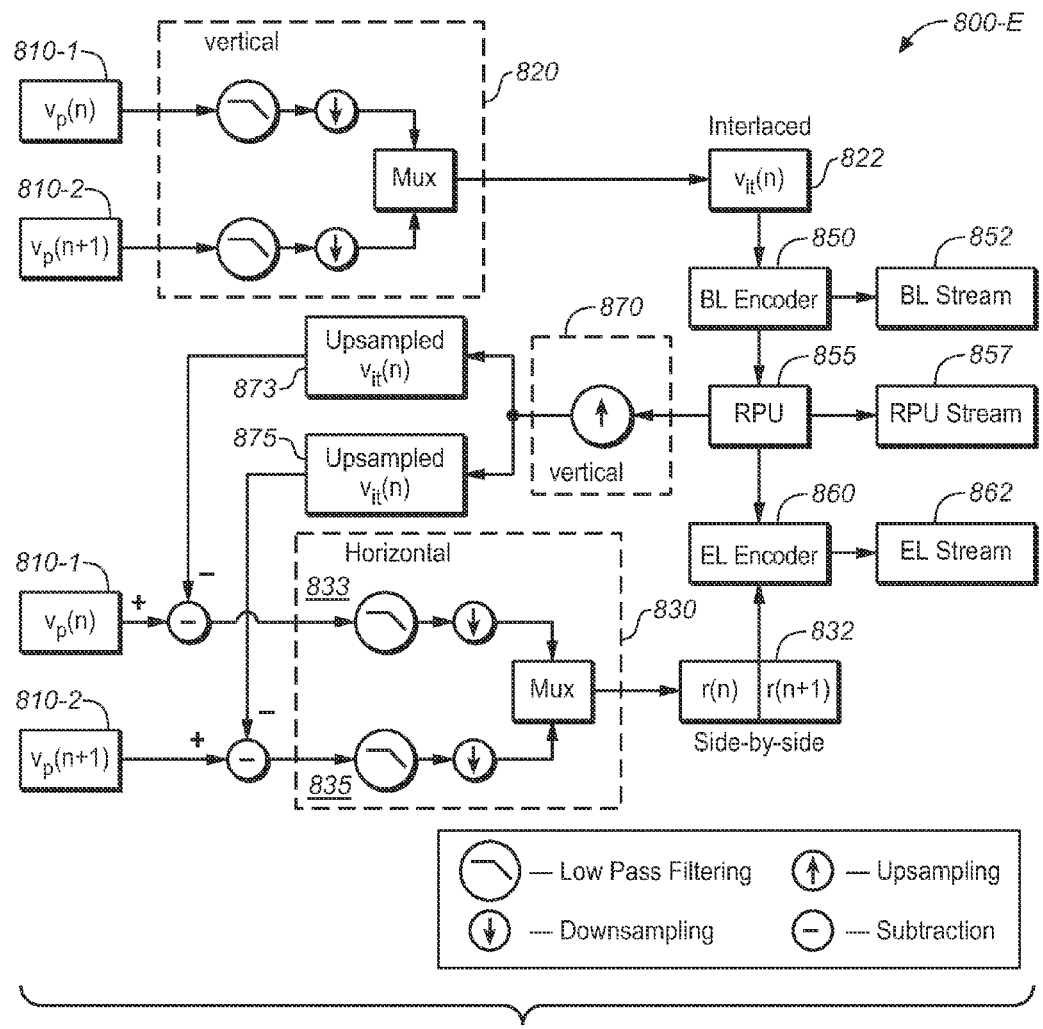
FIG. 8A and FIG. 8B depict an example dual-layer, backwards-compatible encoder and decoder system for delivering progressive video according to another embodiment of the present invention.

FIG. 8A depicts an embodiment for dual-layer, hierarchical, backwards-compatible transmission of both interlaced and progressive content according to an example implementation. Given a sequence of input progressive frames $v_p$ 810, similarly to the vertical processing depicted in FIG. 1A, a combination of low-pass filtering and down-sampling (820) yields TFBF interlaced frames $v_{it}$ 822. The TFBF frame sequence $v_{it}$ 822 may be encoded (compressed) using base-layer encoder 850 to derive a compressed BL stream 852. As discussed earlier, BL encoder may comprise any of the known in the art video compression methods, such as MPEG-2, MPEG-4, and the like.

Using the output of RPU 855, or other equivalent processing and storage means, and vertical up-sampler 870, encoding system 800-E may generate two consecutive up-sampled progressive frames 873 and 875. For example, up-sampled $v_{it}(n)$ 873 may be generated by up-sampling the top field of $v_{it}(n)$ 822 and up-sampled $v_{it}(n+1)$ 875 may be generated by up-sampling the bottom field of $v_{it}(n)$ 822. These frames may be subtracted from the original progressive input frames 810-1 and 810-2 to generate two residual frames 833 and 835.

Similarly to the horizontal processing depicted in FIG. 1B, processing unit 830 utilizes the two residual frames 833 and 835 to construct a side-by-side (SBS) residual frame 832. Residual frame 832 may be encoded (compressed) using EL encoder 860 to generate a compressed EL stream 862. EL encoder may encode the residual 832 on its own (without any reference to the BL sequence), or it may apply inter-layer encoding, using any of the known in the art video compression methods, such as MPEG-2, MPEG-4, H.264 MVC, and the like.

The BL stream 852 and the residual EL stream 862 may be combined (multiplexed) with ancillary information from the RPU stream 857 to be transmitted to a receiver (not shown).

The output of encoder 800-E may be decoded using decoder system 300 depicted in FIG. 3; however, under this embodiment, the output of EL decoder 320 comprises now the SBS residual sequence r 832.

Figure 8B:
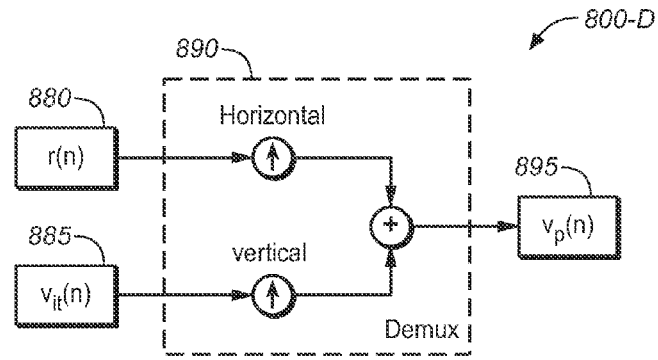

FIG. 8B depicts an embodiment of demultiplexor 370 for generating progressive output $v_p(n)$ 895 using a half-resolution frame 880, the left half or the right half of a decoded enhancement layer SBS frame (e.g., 832) and one field 885, the top field or the bottom field, of the corresponding backwards-compatible interlaced frame $v_{it}(n)$ (e.g. 822 or 380). Unlike the previous embodiments, where the demultiplexor comprises a combination of filters and up-sampling units, this demultiplexor requires no filtering operations, which lends to simpler and more cost-effective decoder implementations.

Using demultiplexor 800-D, r(n) (left half of the decoded SBS EL sequence) may be combined with the top field of $v_{it}(n)$ to generate progressive frame $v_p(n)$, and r(n+1) (right half of the decoded SBS EL sequence) may be combined with the bottom field of $v_{it}(n)$ to generate progressive frame $v_p(n+1)$.

Example Computer System Implemenatation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the encoding and decoding of dual-layer, backwards-compatible, progressive video, such as those described herein. The computer and/or IC may compute any of a variety of parameters or values that relate to methods for encoding and decoding of dual-layer, backwards-compatible progressive video as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement encoding and decoding of dual-layer, backwards-compatible, progressive video as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to dual-layer encoding and decoding of progressive video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method in an encoder comprising:
accessing an input progressive video sequence;
performing vertical processing on at least two consecutive frames of the input progressive video sequence to construct a baseline layer (BL) interlaced top field-bottom field (TFBF) frame in a BL TFBF video sequence;
performing horizontal processing on the at least two consecutive frames of the input progressive video sequence to construct an enhancement layer (EL) side-by-side (SBS) frame in an EL SBS video sequence;
wherein the EL SBS frame has a higher vertical spatial resolution than the BL TFBF frame; and
compressing the BL TFBF sequence and the EL SBS sequence to create a coded, backwards compatible output stream.

2. The method of claim 1, wherein performing vertical processing on two input consecutive frames comprises:
low-pass filtering each of the two input frames in the vertical direction to construct first and second filtered frames;
down-sampling the first filtered frame in the vertical direction to create a top-field frame;
down-sampling the second filtered frame in the vertical direction to create a bottom-field frame; and
multiplexing the top-field frame and the bottom-filed frame to construct a top field-bottom field frame.

3. The method of claim 1, wherein performing horizontal processing on two input consecutive frames comprises:

low-pass filtering each of the two input frames in the horizontal direction to construct first and second filtered frames;
down-sampling the first filtered frame in the horizontal direction to create a left-half frame;
down-sampling the second filtered frame in the horizontal direction to create a right-half frame; and
multiplexing the left-half frame and the right-half frame to construct a side-by-side frame.

4. The method of claim 1, wherein compressing the BL TFBF sequence and the EL SBS sequence comprises compressing the BL TFBF and EL SBS sequences using a multi-view coder (MVC), wherein the BL TFBF sequence is coded as a base view BL stream and the EL SBS sequence is coded as a non-base view EL stream.

5. The method of claim 4, further comprising computing references frames for compressing the EL SBS sequence using a reference processing unit (RPU).

6. The method of claim 1, wherein the input progressive video sequence comprises a 1920×1080 at 50 frames per second sequence.

7. A method in a decoder comprising:
accessing a coded base layer (BL) top field-bottom field (TFBF) stream and a coded enhancement layer (EL) side-by-side (SBS) stream, wherein the coded BL TFBF stream was generated by an encoder based on vertical processing of at least two consecutive frames of a progressive video sequence and the coded EL SBS stream was generated by an encoder based on horizontal processing of the at least two consecutive frames of the progressive video sequence;
decoding the coded BL TFBF stream to generate an interlaced output sequence;
decoding the coded EL SBS stream to generate a decoded SBS sequence;
wherein the EL SBS stream has a higher vertical spatial resolution than the interlaced output sequence; and
demultiplexing the decoded SBS sequence and the interlaced output sequence to generate a progressive output sequence.

8. The method of claim 7, wherein the demultiplexing step comprises:
accessing a decoded BL TFBF frame and a corresponding decoded EL SBS frame;
performing horizontal up-conversion to one half of the decoded EL SBS frame to generate an up-scaled EL frame;
performing vertical up-conversion to one field of the decoded BL TFBF frame to generate an up-scaled BL frame;
applying vertical filtering to the up-scaled EL frame to generate first and second filtered EL frames;
applying horizontal filtering to the up-scaled BL frame to generate first and second filtered BL frames; and
combining the first and second filtered EL frames and the first and second filtered BL frames to generate an output progressive frame.

9. The method of claim 8, wherein applying vertical filtering to the up-scaled EL frame comprises:
performing vertical high-pass filtering to the up-scaled EL frame to generate the first filtered EL frame; and
performing vertical low-pass filtering to the up-scaled EL frame to generate the second filtered EL frame.

10. The method of claim 8, wherein applying horizontal filtering to the up-scaled BL frame comprises:
performing horizontal high-pass filtering to the up-scaled BL frame to generate the first filtered BL frame; and
performing horizontal low-pass filtering to the up-scaled BL frame to generate the second filtered BL frame.

11. The method of claim 7, wherein the demultiplexing step comprises:
accessing a decoded BL TFBF frame and a corresponding decoded EL SBS frame;
performing horizontal up-conversion to one half of the decoded EL SBS frame to generate an up-scaled EL frame;
applying horizontal high-pass filtering to a field of the decoded BL TFBF frame to generate a filtered BL field;
performing vertical up-conversion to the filtered BL field to generate an up-scaled BL frame; and
combining the up-scaled EL frame and the up-scaled BL frame to generate an output progressive frame.

12. The method of claim 7, wherein the demultiplexing step comprises:
accessing a decoded BL TFBF frame and a corresponding decoded EL SBS frame;
performing vertical up-conversion to a field of the decoded BL TFBF frame to generate an up-scaled BL frame;
applying vertical high-pass filtering to one half of the decoded EL SBS frame to generate a filtered EL frame;
performing horizontal up-conversion to the filtered EL frame to generate an up-scaled EL frame; and
combining the up-scaled EL frame and the up-scaled BL frame to generate an output progressive frame.

13. The method of claim 7, further comprising computing references frames for decoding the coded EL SBS stream using a reference processing unit (RPU).

14. The method of claim 7, further comprising:
computing references frames for decoding the coded EL SBS stream using a reference processing unit (RPU);
accessing a decoded BL TFBF frame and a corresponding decoded EL SBS frame;
performing vertical up-conversion to a field of the decoded BL TFBF frame to generate an up-sampled BL frame;
generating an RPU half-frame based on the field of the decoded BL TFBF frame;
subtracting the RPU half-frame from a half of the decoded EL SBS frame to generate a filtered EL frame;
performing horizontal up-sampling to the filtered EL frame to create an up-sampled EL frame; and
combining the up-sampled EL frame and the up-sampled BL frame to generate an output progressive frame.

15. The method of claim 14, wherein generating the RPU half-frame comprises:
performing horizontal low-pass filtering followed by horizontal sub-sampling on the field of the decoded BL TFBF frame to generate a horizontally down-sampled field; and
performing vertical up-sampling to the horizontally down-sampled field to generate the RPU half-frame.

16. A method in an encoder comprising:
accessing an input progressive video sequence;
performing vertical processing on at least two consecutive frames of the input progressive video sequence to construct a baseline layer (BL) interlaced top field-bottom field (TFBF) video frame in a BL TFBF sequence;
computing a first up-sampled frame based on the top field of the BL TFBF frame;
computing a second up-sampled frame based on the bottom field of the BL TFBF frame;
subtracting the first up-sampled frame from the first of the at least two consecutive frames of the input progressive video sequence to generate a first residual frame;

subtracting the second up-sampled frame from the second of the at least two consecutive frames of the input progressive video sequence to generate a second residual frame;

performing horizontal processing on the first and second residual frames to construct an enhancement layer (EL) side-by-side (SBS) residual frame in an EL SBS residual video sequence;

wherein the EL SBS residual frame has a higher vertical spatial resolution than the BL TFBF frame; and compressing the BL TFBF and the EL SBS residual sequences to create a coded, backwards compatible output stream.

17. A method in a decoder comprising:

accessing a coded base layer (BL) top field-bottom field (TFBF) video stream and a coded enhancement layer (EL) side-by-side (SBS) residual stream, wherein the coded BL TFBF video stream was generated by an encoder based on vertical processing of at least two consecutive frames of a progressive video sequence, and the coded EL SBS residual stream was generated by an encoder based on horizontal processing of two consecutive residual frames, wherein the two residual frames are based on the at least two consecutive frames of the progressive video sequence;

decoding the coded BL TFBF stream to generate an interlaced output sequence;

decoding the coded EL SBS residual stream to generate a decoded SBS residual sequence;

wherein the EL SBS residual sequence has a higher vertical spatial resolution than the interlaced output sequence; and demultiplexing the decoded SBS residual stream and the interlaced output sequence to generate a progressive output sequence.

18. The method of claim 17, wherein the demultiplexing step comprises:

accessing a decoded BL TFBF frame and a corresponding decoded EL SBS residual frame;

performing vertical up-conversion to a field of the decoded BL TFBF frame to generate an up-scaled BL frame;

performing horizontal up-conversion to a half of the EL SBS residual frame to generate an up-scaled EL frame; and combining the up-scaled EL frame and the up-scaled BL frame to generate an output progressive frame.

19. An apparatus comprising a processor and configured to perform the method recited in claim 1.

20. A non-transitory computer-readable storage medium having stored thereon computer-executable instruction for executing a method in accordance with claim 1.

* * * * *